Dec. 14, 1926.
C. W. GREENE
SPRING
Filed April 3, 1924
1,610,770
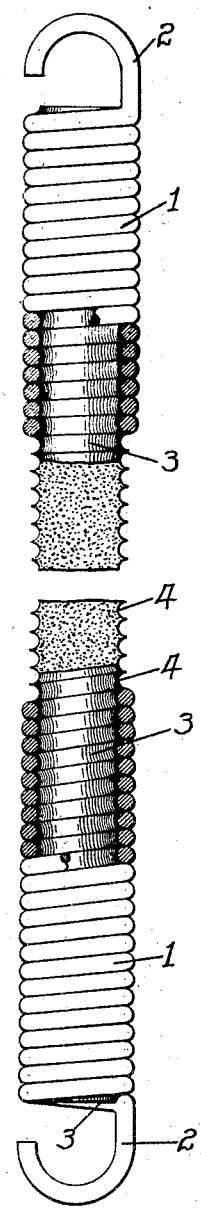

Patented Dec. 14, 1926.

1,610,770

UNITED STATES PATENT OFFICE.

CHARLES W. GREENE, OF TOLEDO, OHIO, ASSIGNOR TO THE W. G. NAGEL ELECTRIC CO., OF TOLEDO, OHIO, A CORPORATION OF OHIO.

SPRING.

Application filed April 3, 1924. Serial No. 703,888.

My invention has for its object to provide an exceedingly simple and efficient means for preventing the humming or vibration and noise that may be caused in spiral springs, either by exterior bodies striking the springs or striking objects to which the springs are connected, or which may occur in the use of the springs. The invention also provides means for preventing the collection of moisture within a helical spring. It also provides a means whereby the elasticity of springs and their resistance to distortion may be modified.

The invention may be contained in spiral or helical springs of any dimensions and which may be used for any purpose. The invention is particularly advantageous when embodied in a tension spring. To illustrate a practical application of the invention, a spring member containing the invention is shown in the accompanying drawings and is described hereinafter.

The figure of the drawings illustrates in part a side view and in part a broken view of a spring member embodying my invention.

1 is a tension spring having the usual turned ends 2 for connecting the spring to parts that are to be drawn towards each other by the elasticity of the spring. Within the turns of the wire of which the spring is formed is located a soft elastic core 3 formed of sponge rubber. In the formation of the spring member, the interior of the spring is filled with a sponge rubber composition which is then slightly vulcanized to cause it to conform to the contour of the interior of the spring. The sponge rubber, before the vulcanization, fills all of the crevices between the turns of the wire that form the spring and so that when it is vulcanized, the soft rubber core will conform to the contour of the interior of the spring. When, therefore, the spring is drawn, the rubber will stretch to the same extent throughout its length, since the wire will lie in a channel 4 that is formed in the surface of the core when it is vulcanized. The channel 4 spirulates the exterior of the core and conforms to the shape of the inner half of the wire of which the spring is formed.

Inasmuch as the entire interior of the spring is filled with a soft rubber core, it will reduce or deaden any noise that might be produced by striking the spring, and eliminate any vibration that might be of a sympathetic nature or that might be produced by striking the spring or parts to which the spring is connected.

I claim:—

In a spring member, a close coiled helical spring having a soft sponge rubber core conforming to the contour of the interior of the spring and vulcanized thereto, said core reducing or deadening noise and eliminating vibration of sympathetic nature or that might be produced by striking the spring or parts to which the spring is connected.

In testimony whereof, I have hereunto signed my name to this specification.

CHARLES W. GREENE.